United States Patent
Brace

(10) Patent No.: US 10,364,342 B2
(45) Date of Patent: *Jul. 30, 2019

(54) TIRE HAVING TREAD FOR LOW TEMPERATURE PERFORMANCE AND WET TRACTION

(71) Applicant: The Goodyear Tire & Rubber Company, Akron, OH (US)

(72) Inventor: Lauren Elizabeth Brace, Chagrin Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 143 days.

This patent is subject to a terminal disclaimer.

(21) Appl. No.: 15/466,161

(22) Filed: Mar. 22, 2017

(65) Prior Publication Data

US 2018/0273733 A1 Sep. 27, 2018

(51) Int. Cl.
*B60C 1/00* (2006.01)
*C08L 9/00* (2006.01)
*C08K 3/36* (2006.01)
*C08L 9/06* (2006.01)

(52) U.S. Cl.
CPC .............. *C08L 9/00* (2013.01); *B60C 1/0016* (2013.01); *C08L 9/06* (2013.01); *C08L 2205/02* (2013.01); *C08L 2205/035* (2013.01); *C08L 2205/06* (2013.01)

(58) Field of Classification Search
CPC ....................................................... C08L 9/06
See application file for complete search history.

(56) References Cited

U.S. PATENT DOCUMENTS

| | | | |
|---|---|---|---|
| 7,096,903 B2* | 8/2006 | Weydert | B60C 1/0016 152/209.1 |
| 7,671,132 B1 | 3/2010 | Thielen et al. | |
| 7,919,553 B2 | 4/2011 | Kawasaki et al. | 524/394 |
| 8,022,136 B2 | 9/2011 | Yano et al. | 524/571 |
| 8,044,118 B2 | 10/2011 | Sakaki et al. | 523/335 |
| 8,100,157 B2 | 1/2012 | Hattori et al. | 152/209.1 |
| 8,312,905 B2* | 11/2012 | Steiner | B60C 1/0016 152/209.1 |
| 9,493,638 B2 | 11/2016 | Sugiura et al. | |
| 9,771,469 B2* | 9/2017 | Sandstrom | C08L 91/00 |
| 2003/0096900 A1* | 5/2003 | Holden | B60C 1/00 524/492 |
| 2017/0174876 A1 | 6/2017 | Maeijma | |
| 2018/0163029 A1* | 6/2018 | Brace | C08L 9/06 |

FOREIGN PATENT DOCUMENTS

EP 2433812 A1 3/2012

OTHER PUBLICATIONS

EPO search report completed Jul. 6, 2018.

* cited by examiner

*Primary Examiner* — Vickey Nerangis
(74) *Attorney, Agent, or Firm* — John D. DeLong; Henry C. Young

(57) ABSTRACT

This invention relates to a tire with tread for promoting a combination of cold weather service at low temperatures and wet traction. The tread is of a rubber composition containing cis 1,4-polybutadiene and dual styrene/butadiene elastomers with reinforcing filler comprised of pre-hydrophobated precipitated silica and rubber reinforcing carbon black. The tread rubber composition may contain triglyceride vegetable oil such as soybean oil.

20 Claims, No Drawings

TIRE HAVING TREAD FOR LOW TEMPERATURE PERFORMANCE AND WET TRACTION

This invention relates to a tire with tread for promoting a combination of cold weather service at low temperatures and wet traction. The tread is of a rubber composition containing cis 1,4-polybutadiene and dual styrene/butadiene elastomers with reinforcing filler comprised of precipitated silica, which may be a pre-hydrophobated precipitated silica, and rubber reinforcing carbon black. The tread rubber composition contains triglyceride vegetable oil. The precipitated silica may be derived from inorganic sand or from rice husks.

BACKGROUND OF THE INVENTION

Tires are sometimes desired with treads for promoting traction on wet surfaces. Various rubber compositions may be proposed for tire treads.

For example, tire tread rubber compositions which contain high molecular weight, high Tg (high glass transition temperature) diene based elastomer(s) might be desired for such purpose particularly for wet traction (traction of tire treads on wet road surfaces). Such tire tread may be desired where its reinforcing filler is primarily precipitated silica which may therefore be considered as being precipitated silica rich.

When such elastomers have a high uncured rubber viscosity (e.g. Mooney, ML1+4. 100° C., viscosity), petroleum based rubber processing oil may be blended with the elastomer(s) to reduce the rubber composition's uncured viscosity and to thereby promote more desirable processing conditions for the uncured rubber composition. The petroleum based rubber processing oil can be added to the elastomer prior to its addition to an internal rubber mixer (e.g. a Banbury rubber mixer) or be added to the rubber composition in the mixer to reduce the viscosity of the rubber composition both in the internal rubber mixer and for subsequent rubber processing such as in a rubber extruder.

Here, the challenge is to reduce the cured stiffness of such tread rubber compositions, as indicated by having a lower storage modulus G' at about −20° C., when the tread is intended to be also useful for low temperature winter conditions, particularly for vehicular snow driving.

It is considered that significant challenges are presented for providing such tire tread rubber compositions for maintaining their wet traction while promoting low temperature (e.g. cold weather) performance.

To achieve such balance of tread rubber performances, it is proposed to evaluate providing a tread rubber composition containing a high Tg (glass transition temperature) elastomer together with an elastomer having a lower Tg to beneficially promote a lower stiffness of the cured rubber composition to improve cold weather performance of the tire tread, while substantially maintaining the tire tread's wet traction capability.

For such challenge, it is proposed to evaluate providing a combination of high Tg and lower Tg styrene/butadiene elastomers together with a low Tg cis 1,4-polybutadiene rubber (PBd) with reinforcing filler comprised of precipitated silica, which may be a pre-hydrophobated precipitated silica, and rubber reinforcing carbon black.

The combination of styrene/butadiene elastomers is proposed to be comprised of a relatively high Tg organic solvent polymerization prepared styrene/butadiene elastomer (S-SBR) to promote wet traction, wherein the high Tg S-SBR is extended with triglyceride based vegetable oil to promote cold weather (winter) tire performance, together with a lower Tg aqueous emulsion polymerization prepared styrene/butadiene elastomer (E-SBR), which is not oil extended, where the E-SBR has a Tg which lower than the Tg of the S-SBR, to beneficially promote lowering the stiffness of the cured rubber composition at about −20° C. by compensating for the presence of the higher Tg S-SBR to thereby further promote cold weather (winter) performance for the rubber composition.

To meet the challenge of providing good cold weather (winter) performance while maintaining wet traction for the tire tread, it is also desired to promote beneficial processability of the uncured rubber composition which contains the high Tg S-SBR by extending the S-SBR with vegetable oil instead of petroleum based rubber processing oil. Such vegetable oil extension of the S-SBR further promotes a beneficially lower cured stiffness of the tread rubber composition at lower temperatures to thereby further promote cold weather performance for the tire tread.

Vegetable triglyceride oil extension of the high Tg S-SBR is to be distinguished from free addition of the vegetable triglyceride oil to the high Tg S-SBR or to the rubber composition. By the term "extension" it is meant that the vegetable oil is added to a cement comprised of a composite of solvent solution of the high Tg S-SBR as a product of polymerization of styrene and 1,3-butadiene monomers is an organic solvent solution with a suitable catalyst to promote the polymerization, wherein the high Tg S-SBR is recovered from the cement as a composite of the high Tg S-SBR and vegetable triglyceride oil.

The innovation of this approach thereby relies on the use of a relatively high Tg vegetable triglyceride oil extended high Tg S-SBR elastomer with a combination of with lower Tg E-SBR and low Tg PBd elastomers together with precipitated silica reinforcement which may be a pre-hydrophobated precipitated silica.

In one embodiment, the rubber composition may, if desired, also contain freely added vegetable triglyceride oil, in addition to vegetable triglyceride oil contained in the vegetable oil extended high Tg SBR, to further promote a lower rubber stiffness at lower temperatures for the tread rubber. By the term "freely added", it is meant that the vegetable oil is added to the rubber composition containing the S-SBR during its physical mixing of rubber and rubber compounding ingredients in contrast to the aforesaid "extending" of the high Tg S-SBR itself.

In one embodiment, to promote wet traction for such evaluation, without significantly detracting from the low temperature performance, it is desired to further evaluate providing at least one traction resin in the tread rubber composition.

Historically it is recognized that triglyceride based vegetable oils such as, for example, soybean oil, has been previously suggested for addition to various rubber compositions such as for example, and not intended to be limiting, in U.S. Pat. Nos. 7,919,553, 8,100,157, 8,022,136 and 8,044,118.

However, while vegetable triglyceride oils have previously been mentioned for use in various rubber compositions, including rubber compositions for tire components, use of vegetable triglyceride oils as an extender oil for a high Tg S-SBR combined with a blend of lower Tg PBd and E-SBR elastomers together with precipitated silica reinforcement, which may be in a form of pre-hydrophobated precipitated silica, is believed to be novel and a significant departure from past practice to both aid in processing of the uncured rubber composition and to provide cured rubber composition for a tire tread to promote a combination of wet traction and low temperature cold weather performance.

In the description of this invention, the terms "compounded" rubber compositions and "compounds" are used to refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

The glass transition temperature (Tg) of the solid elastomers may be determined by DSC (differential scanning calorimetry) measurements, as would be understood and well known by one having skill in such art. The softening point of a resin, where appropriate, may be determined by ASTM E28 which might sometimes be referred to as a ring and ball softening point.

SUMMARY AND PRACTICE OF THE INVENTION

In accordance with this invention, a pneumatic tire is provided having a circumferential rubber tread intended to be ground-contacting, where said tread is a rubber composition comprised of, based on parts by weight per 100 parts by weight elastomer (phr):

(A) 100 phr of a combination of conjugated diene-based elastomers comprised of:
  (1) about 10 to about 50, alternately from about 10 to about 30, phr of an organic solvent polymerization prepared high Tg styrene/butadiene elastomer (high Tg S-SBR) having a Tg in a range of from about −40° C. to about −30° C. with a styrene content in a range of from about 30 to about 35 percent wherein said high Tg S-SBR is extended with from about 10 to about 38 parts by weight per 100 parts of said high Tg S-SBR of triglyceride vegetable oil (desirably to the exclusion of petroleum based oil extension),
  (2) about 10 to about 50, alternately from about 20 to about 40, phr of aqueous emulsion polymerization prepared styrene/butadiene elastomer (E-SBR) having a Tg in a range of from about −65° C. to about −45° C. with a styrene content in a range of from about 15 to about 30 percent, and
  (3) about 20 to about 60, alternately from about 30 to about 50, phr of cis 1,4-polybutadiene rubber having a cis 1,4-isomeric content of at least about 95 percent and having a Tg in a range of from about −90° C. to about −108° C.,
(B) about 50 to about 250, alternately from about 75 to about 175, phr of rubber reinforcing filler comprised of precipitated silica (amorphous synthetic precipitated silica) and rubber reinforcing carbon black containing from about 2 to about 10 phr of said rubber reinforcing carbon black, wherein said precipitated silica is derived from silicon dioxide based inorganic sand or from silicon dioxide containing rice husks and is comprised of at least one of:
  (1) pre-hydrophobated precipitated silica (hydrophobated prior to its addition to the rubber composition) comprised of precipitated silica pre-hydrophobated (pre-reacted) with an alkoxyorganomercaptosilane or bis(3-triethoxysilylpropyl) polysulfide containing an average of from about 2 about 4 connecting sulfur atoms in its polysulfidic bridge, desirably an alkoxy-organomercaptosilane, to form a composite thereof,
  (2) precipitated silica having a nitrogen surface area in a range of from about 140 to about 220 $m^2/g$ plus a silica coupler having a moiety reactive with hydroxyl groups (e.g. silanol groups) on said precipitated silica and another different moiety interactive with said diene-based elastomers, and
  (3) precipitated silica having a nitrogen surface area in a range of from about 90 to about 130 $m^2/g$ plus a silica coupler having a moiety reactive with hydroxyl groups (e.g. silanol groups) on said precipitated silica and another different moiety interactive with said diene-based elastomers,
(C) about 5 to about 45, alternately from about 7 to about 25, phr of traction promoting resin comprised of at least one of terpene, coumarone indene and styrene-alphamethylstyrene resins where such resins desirably have a softening point (ASTM E28) within a range of from about 60° C. to about 150° C., and In one embodiment, said rubber composition contains about 5 to about 50, alternately from about 10 to about 30 phr of freely added vegetable triglyceride oil (freely added to the rubber composition).

In further accordance with this invention, said tire having said tread, is provided as being sulfur cured.

Desirably, said precipitated silica is said pre-hydrophobated silica. Desirably said pre-hydrophobation of said precipitated silica is by reaction, and therefore a product of, the precipitated silica with an alkoxyorganomercaptosilane.

When said precipitated silica is said pre-hydrophobated precipitated silica, additional precipitated silica (non-pre-hydrophobated silica) and/or said coupling agent may optionally be added to the rubber composition. Desirably, said coupling agent for the additional precipitated silica is comprised of bis(3-triethoxysilyl propyl) polysulfide having an average of from about 2 to about 4 connecting sulfur atoms in its polysulfide bridge.

In one embodiment, said vegetable triglyceride oil is comprised of a combination of saturated and unsaturated esters where said unsaturated esters are comprised of a combination of at least one of oleic acid ester, linoleate acid ester and linoleate acid ester. Said saturated esters may be comprised of, for example and not intended to be limiting, at least one of stearic acid ester and palmitate acid ester.

In one embodiment, said vegetable triglyceride oil is comprised of at least one of soybean oil, sunflower oil, rapeseed oil, canola oil, desirably soybean oil.

In one embodiment, the high Tg S-SBR desirably has a high molecular weight to thereby have an uncured Mooney viscosity (ML1+4), 100° C., in a range of from about 60 to about 120.

In one embodiment, the lower Tg E-SBR desirably is of a lower molecular weight than the S-SBR to thereby have an uncured Mooney viscosity (ML1+4), 100° C. in a range of from about 35 to about 50.

In one embodiment, the cis 1,4 polybutadiene rubber has a cis 1,4-isomeric content of at least about 95 percent. It may, for example, have an uncured Mooney viscosity (ML1+4), 100° C., in a range of from about 45 to about 55.

In one embodiment, the tread rubber composition is desirably exclusive of functionalized elastomers (e.g. functionalized styrene/butadiene elastomers).

In one embodiment, the tread rubber composition may contain a functionalized elastomer (e.g. high Tg functionalized styrene/butadiene elastomer containing functional groups comprised of at least one of amine, siloxy, thiol and carboxyl groups reactive with hydroxyl groups contained on precipitated silica).

In one embodiment, said high Tg S-SBR (or said functionalized high Tg styrene/butadiene elastomer) may be, if desired, a tin or silicon coupled elastomer which would thereby increase its molecular weight and uncured Mooney viscosity.

In one embodiment, said traction promoting resin may be a terpene resin comprised of polymers of at least one of limonene, alpha pinene and beta pinene and having a softening point within a range of from about 60° C. to about 140° C.

In one embodiment, said traction promoting resin may be a coumarone indene resin having a softening point in a range of from about 60° C. to about 150° C.

In one embodiment, said traction promoting resin may be a styrene-alphamethylstyrene resin having a softening point in a range of from about 60° C. to about 125° C., alternately from about 80° C. to about 90° C. (ASTM E28), and, for example, a styrene content of from about 10 to about 30 percent.

In one embodiment, the precipitated silica is comprised of:
(A) a precipitated silica derived from inorganic sand (silicon dioxide based sand), or
(B) a precipitated silica derived from rice husks (silicon dioxide containing rice husks).

In one embodiment the precipitates silica is derived from naturally occurring inorganic sand (e.g. $SiO_2$, silicon dioxide, which may contain a trace mineral content). The inorganic sand is typically treated with a strong base such as, for example, sodium hydroxide, to form an aqueous silicate solution (e.g. sodium silicate). A synthetic precipitated silica is formed therefrom by controlled treatment of the silicate with an acid (e.g. a mineral acid and/or acidifying gas such as, for example, carbon dioxide). Sometimes an electrolyte (e.g. sodium sulfate) may be present to promote formation of precipitated silica particles. The recovered precipitated silica is an amorphous precipitated silica.

In one embodiment, the precipitated silica is a rice husk derived precipitated silica. Such precipitated silica is from derived rice plant husks (e.g. burnt ashes from rice husks) which contain $SiO_2$, silicon dioxide, and which may contain trace minerals from the soil in which the rice has been planted). In a similar methodology, the rice husks (e.g. rice husk ash) is typically treated with a strong base such as, for example, sodium hydroxide, to form an aqueous silicate solution (e.g. sodium silicate) following which a synthetic precipitated silica is formed therefrom by controlled treatment of the silicate with an acid (e.g. a mineral acid and/or acidifying gas such as, for example, carbon dioxide) in which an electrolyte (e.g. sodium sulfate) may be present to promote formation of precipitated silica particles derived from rice husks. The recovered precipitated silica is an amorphous precipitated silica. For Example, see U.S. Patent Application Serial No. 2003/0096900.

The precipitated silica, whether derived from the aforesaid silicon dioxide or rice husks, may, for example, have a BET surface area, as measured using nitrogen gas, in the range of, for example, about 40 to about 600, and more usually in a range of about 50 to about 300 square meters per gram. The BET method of measuring surface area might be described, for example, in the *Journal of the American Chemical Society*, Volume 60, as well as ASTM D3037.

Such precipitated silicas may, for example, also have a dibutyl phthalate (DBP) absorption value, for example, in a range of about 100 to about 400, and more usually about 150 to about 300 cc/100 g.

Representative of such pre-hydrophobated precipitated silica may be, for example, Agilon™ 400 from PPG.

Representative examples of rubber reinforcing carbon blacks are, for example, and not intended to be limiting, referenced in *The Vanderbilt Rubber Handbook*, 13$^{th}$ edition, 1990, on Pages 417 and 418 with their ASTM designations. Such rubber reinforcing carbon blacks may have iodine absorptions ranging from, for example, 60 to 240 g/kg and DBP values ranging from 34 to 150 cc/100 g.

Representative of silica coupler for said precipitated silica are:
(A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or
(B) an alkoxyorganomercaptosilane, or
(C) their combination.

Representative of such bis(3-trialkoxysilylalkyl) polysulfide is comprised of bis(3-triethoxysilylpropyl) polysulfide.

Said pre-hydrophobated precipitated silica is desirably a product of precipitated silica and an alkoxyorganomercaptosilane.

Said added precipitated silica (a non-hydrophobated precipitated silica) is desirably added to the rubber composition in combination with said bis(3-triethoxysilylpropyl) polysulfide for reaction thereof in situ within the rubber composition.

It is readily understood by those having skill in the art that the vulcanizable rubber composition would be compounded by methods generally known in the rubber compounding art. In addition said compositions could also contain fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from about 1 to 6 phr being sometimes desired. Typical amounts of processing aids, if used, may comprise, for example, about 1 to about 10 phr.

Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include, for example, stearic, palmitic and oleic acids, particularly a mixture comprised thereof, in an amount, for example, ranging from about 0.5 to about 6 phr. Typical amounts of zinc oxide may comprise, for example, about 0.5 to about 5 phr. Typical amounts of waxes, if used, may comprise, for example, about 0.5 to about 5 phr. Such wax is often a microcrystalline wax. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 3, phr. In another embodiment, combinations of a primary and a secondary accelerator might be used with the secondary accelerator being used in amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, sulfenamides, and xanthates. Often desirably the primary accelerator is a sulfenamide. If a second accelerator is used, the secondary accelerator is often desirably a guanidine such as, for example, a diphenylguanidine or zinc dibenzyl dithiocarbamate.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the pneumatic tire containing the tire tread of the present invention is generally carried out at conventional temperatures in a range of, for example, from about 140° C. to 200° C. Often it is desired that the vulcanization is conducted at temperatures ranging from about 150° C. to about 170° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. The parts and percentages are parts by weight, usually parts by weight per 100 parts by weight rubber (phr) unless otherwise indicated.

EXAMPLE I

In this example, exemplary rubber compositions for a tire tread were prepared for evaluation for use to promote wet traction and cold weather (winter) performance. A Control rubber composition was prepared as Control rubber Sample A with a precipitated silica reinforced rubber composition containing styrene/butadiene rubber and cis 1,4-polybutadiene rubber together with a silica coupler for the precipitated silica reinforcement.

Experimental rubber compositions were prepared as Experimental rubber Samples B, C and D with various combinations of styrene/butadiene elastomers (high Tg S-SBR, including soybean oil extended high Tg S-SBR, and lower Tg E-SBR) together with low Tg cis 1,4-polybutadiene rubber, pre-hydrophobated precipitated silica reinforcing filler and freely added soybean oil. A summary of the rubber compositions are illustrated in the following Table 1.

TABLE 1

| | Parts by Weight (phr) | | | |
| --- | --- | --- | --- | --- |
| | Control | Experimental | | |
| Material | A | B | C | D |
| Styrene/butadiene rubber (S-SBR-A)[1] | 67 | 0 | 0 | 0 |
| Styrene/butadiene rubber (S-SBR-B)[2] | 0 | 30 | 30 | 50 |
| Styrene/butadiene rubber (E-SBR)[3] | 0 | 31 | 31 | 15 |
| Cis 1,4-polybutadiene rubber[4] | 33 | 44 | 44 | 44 |
| Rubber processing oil[5] | 27 | 0 | 0 | 0 |
| Soybean oil, freely added[6] | 0 | 12 | 12 | 8 |
| Traction resin[7] | 7.5 | 20 | 20 | 10 |
| Precipitated silica[8] | 95 | 0 | 0 | 0 |
| Silica coupler[9] | 7.6 | 0 | 0 | 0 |
| Pre-hydrophobated precipitated silica[10] | 0 | 110 | 95 | 105 |
| Fatty acids[11] | 5 | 2 | 2 | 2 |
| Carbon black (N120) | 4 | 2 | 2 | 2 |
| Wax (microcrystalline and paraffinic) | 1.5 | 1.5 | 1.5 | 1.5 |
| Antioxidants | 2.8 | 2.8 | 2.8 | 2.8 |
| Zinc oxide | 1.8 | 1.8 | 1.8 | 1.8 |
| Sulfur | 1.6 | 1.2 | 1.2 | 1.2 |
| Sulfur cure accelerators[12] | 4.5 | 3.3 | 3.3 | 3.3 |

[1]An organic solvent polymerization prepared styrene/butadiene rubber (S-SBR-A) having a Tg of about −23° C. and a styrene content of about 21 percent as Sprintan ™ SLR4602 from Trinseo
[2]An organic solvent polymerization prepared styrene/butadiene rubber (S-SBR-B) having a Tg of about −35° C. and a styrene content of about 33 from The Goodyear Tire & Rubber Company extended with about 20 parts by weight soybean oil per 100 parts by weight of the S-SBR-B
[3]An aqueous emulsion polymerization prepared styrene/butadiene rubber (E-SBR) having a Tg of about −55° C. and a styrene content of about 23.5 percent as PLF1502 from The Goodyear Tire & Rubber Company
[4]A cis 1,4-polybutadiene elastomer having a cis 1,4- content of about 96 percent and a Tg of about −106° C. as BUD1223 ™ from The Goodyear Tire & Rubber Company
[5]Rubber processing oil primarily comprised of naphthenic oil
[6]Soybean oil freely added to the rubber composition in a sense of not used to extend the styrene/butadiene rubber, as Sterling Oil from Stratus Food Company or Master Chef Soybean Oil 22393 from Cargill as a triglyceride soybean oil
[7]Traction promoting resin as styrene-alphamethylstyrene copolymer having a softening point in a range of about 80° C. to 90° C. (ASTM E28) and a styrene content in a range of from about 10 to about 30 percent as Eastman Impera ™ P1504 from Eastman Chemical
[8]Precipitated silica as Zeosil 1165MP ™ from Solvay (derived from inorganic sand)
[9]Silica coupler comprised of a bis(3-triethoxysilylpropyl) polysulfide containing an average in a range of from about 2 to about 2.6 connecting sulfur atoms in its polysulfidic bridge as Si266 from Evonik. The coupler was used without carbon black as a carrier.
[10]Pre-hydrophobated precipitated silica, precipitated silica treated with an alkoxyorganomercaptosilane, as Agilon 400 ™ from PPG Industries
[11]Fatty acids comprised of stearic, palmitic and oleic acids
[12]Sulfur cure accelerators as sulfenamide primary accelerator and diphenylguanidine or zinc dibenzyl dithiocarbamate The rubber Samples were prepared by similar mixing procedures, wherein the elastomers and compounding ingredients were mixed together in a first non-productive mixing stage (NP1) in an internal rubber mixer for about 4 minutes to temperatures between about 140° C. and about 160° C. The resulting mixtures were subsequently mixed in a second sequential non-productive mixing stage (NP2) in an internal rubber mixer to temperatures between about 140° C. and about 160° C. Optionally the rubber compositions were subsequently mixed in a third sequential non-productive mixing stage (NP3) in an internal rubber mixer to a temperature between about 140° C. and about 160° C. The rubber compositions were subsequently mixed in a productive mixing stage (P) in an internal rubber mixer with a sulfur cure package, namely sulfur and sulfur cure accelerator(s), for about 2 minutes to a temperature of about 115°

C. The rubber compositions were each removed from its internal mixer after each mixing step and cooled to below 40° C. between each individual non-productive mixing stage and before the final productive mixing stage.

The following Table 2 illustrates cure behavior and various physical properties of rubber compositions based upon the basic formulation of Table 1 and reported herein as Control rubber Sample A and Experimental rubber Samples B, C and D. Where cured rubber samples are reported, such as for the stress-strain, hot rebound and hardness values, the rubber samples were cured for about 14 minutes at a temperature of about 160° C.

To establish the predictive wet traction, a tangent delta (tan delta) test was run at 0° C.

To establish the predictive low temperature (cold weather) performance, the cured rubber's stiffness (storage modulus G') test was run at −20° C. and the rebound value at 100° C. was used for predictive rolling resistance performance.

TABLE 2

| | Parts by Weight (phr) | | | |
| | Control | Experimental | | |
| | A | B | C | D |
| --- | --- | --- | --- | --- |
| Material | | | | |
| Styrene/butadiene rubber (S-SBR-A) | 67 | 0 | 0 | 0 |
| Styrene/butadiene rubber (S-SBR-B) | 67 | 30 | 30 | 50 |
| Styrene/butadiene rubber (E-SBR) | 0 | 31 | 31 | 15 |
| Cis 1,4-polybutadiene rubber | 0 | 44 | 44 | 44 |
| Rubber processing oil | 27 | 0 | 0 | 0 |
| Soybean oil, freely added | 0 | 12 | 12 | 8 |
| Pre-hydrophobated precipitated silica | 0 | 110 | 95 | 105 |
| Tackifying resin | 7.5 | 20 | 20 | 10 |
| Properties | | | | |
| Wet Traction Laboratory Prediction | | | | |
| Tan delta (at 0° C., 3% strain, 10 Hertz) | 0.42 | 0.35 | 0.35 | 0.35 |
| Cold Weather (Winter) Performance (Stiffness) Laboratory Prediction | | | | |
| Storage modulus (G'), (MPa) at −20° C., 10 Hertz, 3% strain (lower stiffness values are better) | 15.7 | 14.4 | 12.8 | 13 |
| Rolling Resistance (RR) Laboratory Prediction (predictive hysteresis) | | | | |
| Rebound at 100° C., (%), higher is better) | 61 | 58 | 63 | 59 |
| Additional properties | | | | |
| Tensile strength (MPa) | 17.5 | 15.3 | 16.2 | 15.8 |
| Elongation at break (%) | 392 | 617 | 610 | 548 |
| Modulus (Die C) 300% (MPa) | 12.2 | 6.9 | 6.8 | 8.3 |

From Table 2 it is observed that snow traction at low temperatures in a sense of stiffness is predictably improved, in a sense of lower determined stiffness values at −20° C., of 14.4, 12.8 and 13, respectively, for Experimental rubber compositions B, C and D compared to a stiffness value of 15.7 for Control rubber composition A, with only slight detriment to predictive wet traction in a sense of tan delta values of 0.35 for Experimental rubber compositions B, C and D as compared to a tan delta value of 0.42 for Control rubber composition A.

From Table 2 it is observed that the hysteresis is beneficially maintained by Experimental rubber compositions B, C and D as compared to Control rubber composition A in a sense of hot rebound (100° C.) values of 58, 63 and 59 percent, respectively, for Experimental rubber compositions B, C and D compared to a value of 61 percent for Control rubber composition A.

It is thereby concluded that Experimental rubber compositions B, C and D, which were comprised of a combination of soybean oil extended organic solution polymerization prepared styrene/butadiene rubber, aqueous emulsion polymerization prepared styrene/butadiene rubber and cis 1,4-polybutadiene rubber together with reinforcing filler composed of pre-hydrophobated precipitated silica, and traction promoting resin composed of styrene-alphamethylstyrene resin provided a discovery of a beneficial combination of low temperature stiffness (G') properties, predictive of low temperature cold weather traction, while maintaining a low temperature tan delta property, predictive of wet traction and satisfactory hysteresis, predictive of satisfactory rolling resistance, for a tire with tread of such rubber composition.

EXAMPLE II

Experimental passenger automobile pneumatic tires of size 215/60R 16 were prepared with treads comprised of rubber composition Control A and Experimental rubber compositions B, C and D of Example I and correspondingly identified as Control A treaded tire and Experimental B, C and D treaded tires, respectfully.

The tires were mounted on rigid wheels and tested under low temperature conditions. Results of the tire tests are reported in the following Table 3 with the results for tires with treads of Control rubber composition A normalized to values of 100 and results for Experimental tires with treads of rubber compositions B, C and D related to the normalized values.

The values for Control A tire are normalized to a value of 100 and the values for Experimental B, C and D tires are compared to the normalized values of 100 for Control A tire.

TABLE 3

| | Control | Experimental | | |
| | A | B | C | D |
| --- | --- | --- | --- | --- |
| Tire cold weather (winter) snow traction (higher is better) | 100 | 106 | 107 | 108 |
| Tire wet traction (higher is better) | 100 | 100 | 99 | 97 |
| Tire rolling resistance (higher is indication of beneficially lower rolling resistance) | 100 | 97 | 99 | 93 |

From Table 3 it can be seen that the pneumatic tires with treads of Experimental rubber compositions B, C and D exhibited cold weather (winter) traction values of 106, 107 and 108 which were significantly improved over normalized value of 100 for tires with treads of Control rubber composition A.

From Table 3 it can be seen that pneumatic tires with treads of Experimental rubber compositions B, C and D exhibited wet traction values of 100, 99 and 97 which were the same or similar to normalized value of 100 for tires with treads of Control rubber composition A.

From Table 3 it can be seen that pneumatic tires with treads of Experimental rubber compositions B, C and D exhibited rolling resistance values of 97, 99 and 93 similar to normalized values of 100 for tires with treads of Control rubber composition A.

It is thereby concluded that pneumatic tires with treads of Experimental rubber compositions B, C and D, which were comprised of a combination of soybean oil extended organic solution polymerization prepared high Tg styrene/butadiene rubber, aqueous emulsion polymerization prepared lower Tg styrene/butadiene rubber and low Tg cis 1,4-polybutadiene rubber together with reinforcing filler composed of pre-hydrophobated precipitated silica, confirmed a discovery of a beneficial combination of low temperature snow traction while substantially maintaining wet traction and satisfactory rolling resistance for such tires.

EXAMPLE III

In this example, additional exemplary rubber compositions for a tire tread were prepared for evaluation for use to promote wet traction and cold weather (winter) performance.

A Control rubber composition was prepared as Control rubber Sample E which was a duplicate of Experimental rubber Sample B of Example I which contained a pre-hydrophobated precipitated silica (precipitated silica pre-treated with an alkoxyorganomercaptosilane) as Agilon 400™ from PPG Industries.

Experimental rubber Samples F and G were similar to Control rubber Sample E except that, instead of the pre-treated precipitated silica, a precipitated silica was added to the rubber composition as Zeosil 1165™ MP from Solvay for Experimental rubber Sample F and MFIL™ 125 from Madhu Silica for Experimental rubber Sample G. A silica coupler was added to the rubber composition to couple the precipitated silica to the diene-based elastomers.

A summary of the rubber compositions are illustrated in the following Table 4.

TABLE 4

|  | Parts by Weight (phr) | | |
|---|---|---|---|
|  | Control | Experimental | |
| Material | E | F | G |
| Styrene/butadiene rubber (S-SBR-B)[2] | 30 | 30 | 30 |
| Styrene/butadiene rubber (E-SBR)[3] | 31 | 31 | 31 |
| Cis 1,4-polybutadiene rubber[4] | 44 | 44 | 44 |
| Soybean oil (freely added)[6] | 12 | 12 | 12 |
| Traction resin[7] | 20 | 20 | 20 |
| Pre-hydrophobated silica[10] | 110 | 0 | 0 |
| Precipitated silica A[13] | 0 | 95 | 0 |
| Precipitated silica B[14] | 0 | 0 | 105 |
| Silica coupler[9] | 0 | 7.6 | 8.4 |
| Fatty acids[11] | 2 | 2 | 2 |
| Carbon black (N120) | 2 | 2 | 2 |
| Wax (microcrystalline and paraffinic) | 1.5 | 1.5 | 1.5 |
| Antioxidants | 2.8 | 2.8 | 2.8 |
| Zinc oxide | 1.8 | 1.8 | 1.8 |
| Sulfur | 1.2 | 1.2 | 1.2 |
| Sulfur cure accelerators[12] | 3.3 | 5 | 5 |

[2]An organic solvent polymerization prepared styrene/butadiene rubber (S-SBR-B) having a Tg of about −35° C. and a styrene content of about 33 from The Goodyear Tire & Rubber Company extended with about 20 parts by weight soybean oil per 100 parts by weight of the S-SBR-B
[3]An aqueous emulsion polymerization prepared styrene/butadiene rubber (E-SBR) having a Tg of about −55° C. and a styrene content of about 23.5 percent as PLF1502 from The Goodyear Tire & Rubber Company
[4]A cis 1,4-polybutadiene elastomer having a cis 1,4- content of about 96 percent and a Tg of about −106° C. as BUD1223 ™ from The Goodyear Tire & Rubber Company
[6]Soybean oil freely added to the rubber composition in a sense of not used to extend the styrene/butadiene rubber, as Sterling Oil from Stratus Food Company or Master Chef Soybean Oil 22393 from Cargill as a triglyceride soybean oil
[7]Traction promoting resin as styrene-alphamethylstyrene copolymer having a softening point in a range of about 80° C. to 90° C. (ASTM E28) and a styrene content in a range of from about 10 to about 30 percent as Eastman Impera ™ P1504 from Eastman Chemical
[9]Silica coupler comprised of a bis(3-triethoxysilylpropyl) polysulfide containing an average in a range of from about 2 to about 2.6 connecting sulfur atoms in its polysulfidic bridge as Si266 from Evonik. The coupler was used without carbon black as a carrier.
[10]Pre-hydrphobated precipitated silica, precipitated silica treated with an alkoxyorgano-mercaptosilane, as Agilon 400 ™ from PPG Industries
[11]Fatty acids comprised of stearic, palmitic and oleic acids
[12]Sulfur cure accelerators as sulfenamide primary accelerator and diphenylguanidine or zinc dibenzyl dithiocarbamate
[13]Precipitated silica as Zeosil 1165MP ™ from Solvay having a reported BET nitrogen surface of about 160 m²/g
[14]Precipitated silica as MFIL ™ from Madkhu Silica having a reported BET nitrogen surface area of about 125 m²/g The rubber Samples were prepared by similar mixing procedures, wherein the elastomers and compounding ingredients were mixed together in a first non-productive mixing stage (NP1) in an internal rubber mixer for about 4 minutes to temperatures between about 140° C. and about 160° C. The resulting mixtures were subsequently mixed in a second sequential non-productive mixing stage (NP2) in an internal rubber mixer to temperatures between about 140° C. and about 160° C. Optionally the rubber compositions were subsequently mixed in a third sequential non-productive mixing stage (NP3) in an internal rubber mixer to a temperature between about 140° C. and about 160° C. The rubber compositions were subsequently mixed in a productive mixing stage (P) in an internal rubber mixer with a sulfur cure package, namely sulfur and sulfur cure accelerator(s), for about 2 minutes to a temperature of about 115° C. The rubber compositions were each removed from its internal mixer after each mixing step and cooled to below 40° C. between each individual non-productive mixing stage and before the final productive mixing stage.

The following Table 5 illustrates cure behavior and various physical properties of rubber compositions based upon the basic formulation of Table 4 and reported herein as Control rubber Sample E and Experimental rubber Samples F and G. Where cured rubber samples are reported, such as for the stress strain, hot rebound and hardness values, the rubber samples were cured for about 14 minutes at a temperature of about 160° C.

To establish the predictive wet traction, a tangent delta (tan delta) test was run at 0° C.

To establish the predictive low temperature (cold weather) performance, the cured rubber's stiffness (storage modulus G') test was run at −20° C. and the rebound value at 100° C. was used for predictive rolling resistance performance.

TABLE 5

| | Parts by Weight (phr) | | |
| --- | --- | --- | --- |
| | Control | Experimental | |
| | E | F | G |
| Material | | | |
| Styrene/butadiene rubber (S-SBR-B) | 30 | 30 | 30 |
| Styrene/butadiene rubber (E-SBR) | 31 | 31 | 31 |
| Cis 1,4-polybutadiene rubber | 44 | 44 | 44 |
| Soybean oil, freely added | 12 | 12 | 12 |
| Traction resin | 20 | 20 | 20 |
| Pre-hydrophobated silica | 110 | 0 | 0 |
| Precipitated silica A | 0 | 95 | 0 |
| Precipitated silica B | 0 | 0 | 105 |
| Properties | | | |
| Wet Traction Laboratory Prediction | | | |
| Tan delta (at 0° C., 3% strain, 10 Hertz) | 0.36 | 0.40 | 0.46 |
| Cold Weather (Winter) Performance (Stiffness) Laboratory Prediction | | | |
| Storage modulus (G'), (MPa) at −20° C., 10 Hertz, 3% strain (lower stiffness values are better) | 13.5 | 19.7 | 15.9 |
| Rolling Resistance (RR) Laboratory Prediction (predictive hysteresis) | | | |
| Rebound at 100° C. (%) (higher is better) | 57.3 | 50.6 | 52.3 |
| Additional properties | | | |
| Tensile strength (MPa) | 15.4 | 16.9 | 17.1 |
| Elongation at break (%) | 642 | 615 | 610 |
| Modulus (Die C) 300% (MPa) | 6.9 | 7.2 | 7.9 |

From Table 5 it is observed that cold weather performance indicators at low temperatures in a sense of stiffness are better, in a sense of lower determined stiffness value at −20° C., of 13.5 MPa for the Control rubber composition E as compared to Stiffness values of 19.7 and 15.9 for Experimental rubber compositions F and G, respectively, with only a slight detriment to predictive wet traction in a sense of tan delta value of 0.36 for Control rubber composition E as compared to tan delta values of 0.4 and 0.46 for Experimental rubber compositions F and G.

From Table 5 it is observed that the hysteresis (evidenced by rebound values) is beneficially maintained by Control rubber composition E as compared to Experimental rubber composition F in a sense of hot rebound (100° C.) value of 57.3 percent for Control rubber composition E compared to values of 50.6 and 52.3 percent for Experimental rubber compositions F and G, respectively.

It is thereby concluded that Control rubber composition E which contained 110 phr of the pre-hydrophobated precipitated silica together with a combination of soybean oil extended organic solution polymerization prepared high Tg styrene/butadiene rubber, aqueous emulsion polymerization prepared lower Tg styrene/butadiene rubber and low Tg cis 1,4-polybutadiene rubber provided a discovery of a beneficial combination of low temperature stiffness (G') properties, predictive of low temperature cold weather traction, while maintaining a low temperature tan delta property, predictive of wet traction and satisfactory hysteresis, predictive of satisfactory rolling resistance, for a tire with tread of such rubber composition.

While various embodiments and details have been shown for the purpose of illustrating the invention, it will be apparent to those skilled in this art that various changes and modifications may be made therein without departing from the spirit or scope of the invention.

What is claimed is:

1. A pneumatic tire having a circumferential rubber tread of a rubber composition comprised of, based on parts by weight per 100 parts by weight elastomer (phr):
   (A) 100 parts by weight of a combination of conjugated diene-based elastomers comprised of:
      (1) about 10 to about 50 phr of an organic solvent polymerization prepared high Tg styrene/butadiene elastomer having a Tg in a range of from about −40° C. to about −30° C. with a styrene content in a range of from about 30 to about 35 weight percent wherein said high Tg S-SBR is extended with from about 10 to about 38 parts by weight per 100 parts of said high Tg styrene/butadiene elastomer of triglyceride vegetable oil,
      (2) about 10 to about 50 phr of aqueous emulsion polymerization prepared styrene/butadiene elastomer having a Tg in a range of from about −65° C. to about −45° C. with a styrene content in a range of from about 15 to about 30 weight percent, and
      (3) about 20 to about 60 phr of cis 1,4-polybutadiene rubber having a cis 1,4-isomeric content of at least about 95 percent and having a Tg in a range of from about −100° C. to about −108° C.,
   (B) about 50 to about 250 phr of rubber reinforcing filler comprised of a combination of precipitated silica derived from silicon dioxide based inorganic sand or from silicon dioxide containing rice husks and rubber reinforcing carbon black where said reinforcing filler is comprised of from about 2 to about 10 phr of said rubber reinforcing carbon black, wherein said precipitated silica of said reinforcing filler is comprised of at least one of:
      (1) pre-hydrophobated precipitated silica comprised of precipitated silica pre-hydrophobated with an alkoxyorganomercaptosilane or bis(3-triethoxysilylpropyl) polysulfide containing an average of from about 2 about 4 connecting sulfur atoms in its polysulfidic bridge to form a composite thereof,
      (2) precipitated silica having a nitrogen surface area in a range of from about 140 to about 220 $m^2/g$ together with a silica coupler having a moiety reactive with hydroxyl groups on said precipitated silica and another different moiety interactive with said diene-based elastomers, and
      (3) precipitated silica having a nitrogen surface area in a range of from about 90 to about 130 $m^2/g$ together with a silica coupler having a moiety reactive with hydroxyl groups on said precipitated silica and another different moiety interactive with said diene-based elastomers,
   (C) about 5 to about 45 phr of traction promoting resin comprised of at least one of terpene, coumarone indene and styrene-alphamethylstyrene resins having a softening point within a range of from about 60° C. to about 150° C.

2. The tire of claim 1 wherein said rubber composition contains about 5 to about 50 phr of freely added vegetable triglyceride oil.

3. The tire of claim 2 wherein said freely added triglyceride vegetable oil is comprised of at least one of soybean oil, sunflower oil, rapeseed oil and canola oil.

4. The tire of claim 2 wherein said freely added vegetable triglyceride oil is comprised of soybean oil.

5. The tire of claim 1 wherein said precipitated silica is a pre-hydrophobated precipitated silica comprised of precipitated silica pre-hydrophobated with an alkoxyorganomercaptosilane or bis(3-triethoxysilylpropyl) polysulfide containing an average of from about 2 about 4 connecting sulfur atoms in its polysulfidic bridge to form a composite thereof.

6. The tire of claim 5 wherein said rubber composition contains an additional precipitated silica.

7. The tire of claim 5 wherein said rubber composition contains an additional silica coupling agent comprised of a bis(3-triethoxysilyl propyl) polysulfide having an average of from about 2 to about 4 connecting sulfur atoms in its polysulfide bridge.

8. The tire of claim 1 wherein said precipitated silica is a pre-hydrophobated precipitated silica comprised of precipitated silica pre-hydrophobated with an alkoxyorganomercaptosilane to form a composite thereof.

9. The tire of claim 8 wherein said rubber composition contains an additional precipitated silica.

10. The tire of claim 8 wherein said rubber composition contains an additional precipitated silica together with a silica coupling agent comprised of a bis(3-triethoxysilyl propyl) polysulfide having an average of from about 2 to about 4 connecting sulfur atoms in its polysulfide bridge.

11. The tire of claim 1 wherein said precipitated silica is a precipitated silica having a nitrogen surface area in a range of from about 140 to about 220 $m^2/g$ together with a silica coupler having a moiety reactive with hydroxyl groups on said precipitated silica and another different moiety interactive with said diene-based elastomers comprised of at least one of alkoxyorganomercaptane and bis (3-triethoxysilylpropyl) containing an average of from about 2 to about 4 connecting sulfur atoms in its polysulfidic bridge.

12. The tire of claim 1 wherein said precipitated silica is a precipitated silica having a nitrogen surface area in a range of from about 90 to about 130 $m^2/g$ together with a silica coupler having a moiety reactive with hydroxyl groups on said precipitated silica and another different moiety interactive with said diene-based elastomers comprised of at least one of alkoxyorganomercaptane and bis (3-triethoxysilylpropyl) containing an average of from about 2 to about 4 connecting sulfur atoms in its polysulfidic bridge.

13. The tire of claim 1 wherein said triglyceride vegetable oil for said styrene/butadiene elastomer oil extension is comprised of at least one of soybean oil, sunflower oil, rapeseed oil and canola oil.

14. The tire of claim 1 wherein said triglyceride vegetable oil for said styrene/butadiene elastomer oil extension is comprised of soybean oil.

15. The tire of claim 1 wherein said high Tg styrene/butadiene elastomer has an uncured Mooney viscosity (ML1+4), 100° C., in a range of from about 60 to about 120.

16. The tire of claim 1 wherein said high Tg styrene/butadiene elastomer is tin or silicon coupled.

17. The tire of claim 1 wherein said high Tg styrene/butadiene elastomer is a functionalized elastomer containing at least one of amine, siloxy, thiol and carboxyl groups reactive with hydroxyl groups on said precipitated silica.

18. The tire of claim 1 wherein said traction promoting resin is a styrene/alphamethylstyrene resin having a softening point in a range of from about 60° C. to about 125° C.

19. The tire of claim 1 wherein said precipitated silica is derived from silicon dioxide based inorganic sand.

20. The tire of claim 1 wherein said precipitated silica is derived from silicon dioxide containing rice husks.

* * * * *